United States Patent
Stewart et al.

(10) Patent No.: US 7,535,916 B2
(45) Date of Patent: May 19, 2009

(54) METHOD FOR SHARING A TRANSPORT CONNECTION ACROSS A MULTI-PROCESSOR PLATFORM WITH LIMITED INTER-PROCESSOR COMMUNICATIONS

(75) Inventors: Randall Stewart, Chapin, SC (US); Stewart Frederick Bryant, Green Park Reading (GB); Peter Lei, Arlington Heights, IL (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 11/053,093

(22) Filed: Feb. 7, 2005

(65) Prior Publication Data

US 2006/0176904 A1 Aug. 10, 2006

(51) Int. Cl.
*H04L 12/28* (2006.01)
*H04J 3/16* (2006.01)
*G06F 15/16* (2006.01)

(52) U.S. Cl. ........................ 370/419; 370/389; 370/400; 370/469; 709/231

(58) Field of Classification Search ................ 370/466, 370/467; 379/229, 230; 709/230
See application file for complete search history.

(56) References Cited

U.S. PATENT DOCUMENTS 6,567,377 B1 * 5/2003 Vepa et al. .................. 370/230
6,678,283 B1 * 1/2004 Teplitsky ..................... 370/463
6,735,647 B2 * 5/2004 Boyd et al. ..................... 710/52

(Continued)

OTHER PUBLICATIONS

Stewart, R. et al., "Stream Control Transmission Protocol (SCTP) Partial Reliability Extension," RFC 3758, May 2004, pp. 1-22.*

(Continued)

*Primary Examiner*—Daniel J Ryman
*Assistant Examiner*—Thinh D Tran
(74) *Attorney, Agent, or Firm*—Hickman Palermo Truong & Becker LLP

(57) ABSTRACT

A method is disclosed for sharing a transport connection in a host having two or more processors that exchange limited inter-processor communications. Ranges of transport sequence numbers are assigned to the processors of the host, and a range assigned to a particular processor does not overlap with any other range assigned to any other processor. An outbound message is sent over the transport connection from a processor of the host, where the message includes a transport sequence number selected from the range assigned to that processor. An inbound message is received at a designated processor of the host that is configured to receive all inbound messages sent to the host over the transport connection.

43 Claims, 5 Drawing Sheets

U.S. PATENT DOCUMENTS

| | | | |
|---|---|---|---|
| 6,785,843 B1 * | 8/2004 | McRae et al. | 714/23 |
| 6,795,546 B2 * | 9/2004 | Delaney et al. | 379/229 |
| 7,051,109 B1 * | 5/2006 | Stewart et al. | 709/230 |
| 7,167,922 B2 * | 1/2007 | Narayanan | 709/242 |
| 2002/0069369 A1 * | 6/2002 | Tremain | 713/201 |
| 2004/0003241 A1 * | 1/2004 | Sengodan et al. | 713/168 |
| 2004/0042609 A1 * | 3/2004 | Delaney et al. | 379/229 |
| 2004/0049580 A1 * | 3/2004 | Boyd et al. | 709/226 |
| 2005/0022089 A1 * | 1/2005 | Le et al. | 714/749 |
| 2005/0091307 A1 * | 4/2005 | Venkatsubra et al. | 709/203 |
| 2005/0169186 A1 * | 8/2005 | Qiu et al. | 370/242 |
| 2006/0164974 A1 * | 7/2006 | Ramalho et al. | 370/219 |

OTHER PUBLICATIONS

Stewart, R. et al., "Stream Control Transmission Protocol," RFC 2960, Oct. 2000, pp. 1-134.*

Kohler, Eddie et al., "Datagram Congestion Control Protocol (DCCP)," Engineering Task Force Internet-Drafl, draft-ietf-dccp-spec-09.txt expiring May 14, 2005, written Nov. 14, 2004, pp. 1-126.*

Kohler, Eddie et al., "Datagram Congestion Control Protocol (DCCP)," Engineering Task Force Internet-Draft, draft-ietf-dccp-spec-09.txt expiring May 14, 2005, written Nov. 14, 2004, pp. 1-126.

* cited by examiner

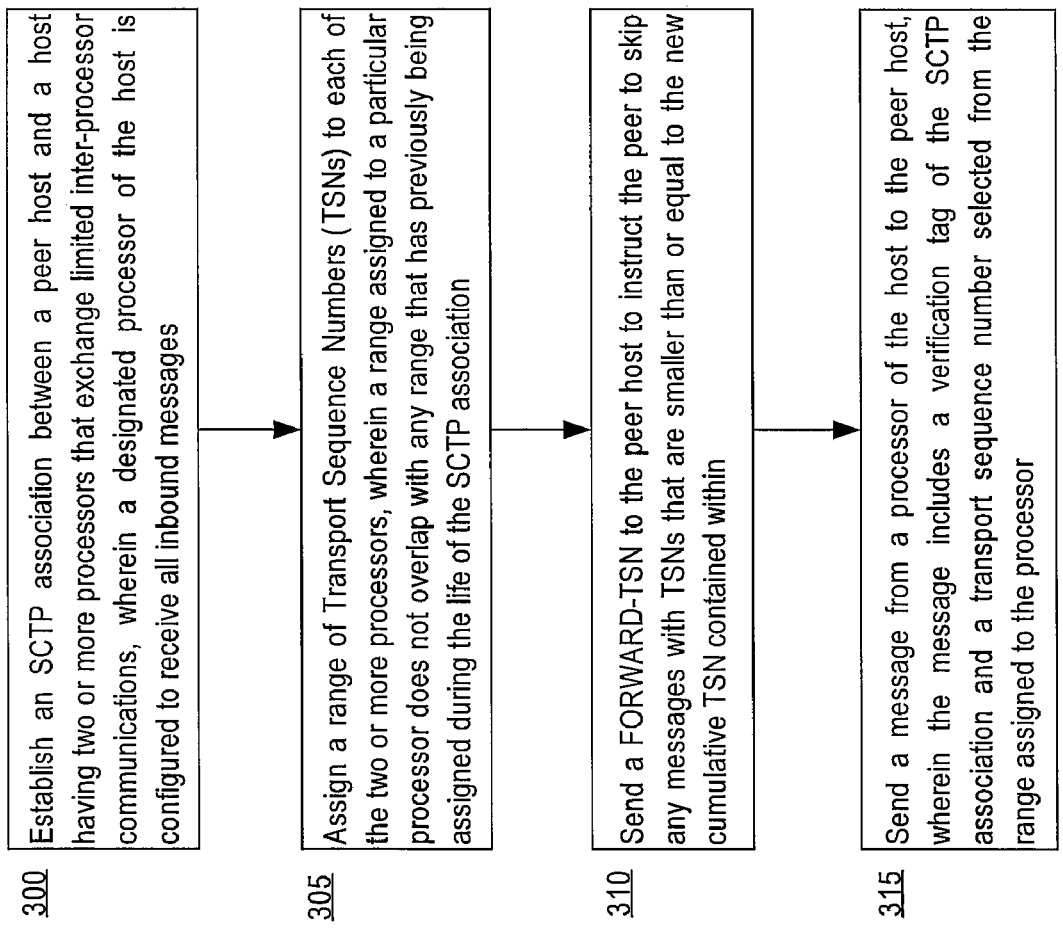

Fig. 3

300 Establish an SCTP association between a peer host and a host having two or more processors that exchange limited inter-processor communications, wherein a designated processor of the host is configured to receive all inbound messages 305 Assign a range of Transport Sequence Numbers (TSNs) to each of the two or more processors, wherein a range assigned to a particular processor does not overlap with any range that has previously being assigned during the life of the SCTP association 310 Send a FORWARD-TSN to the peer host to instruct the peer to skip any messages with TSNs that are smaller than or equal to the new cumulative TSN contained within 315 Send a message from a processor of the host to the peer host, wherein the message includes a verification tag of the SCTP association and a transport sequence number selected from the range assigned to the processor

METHOD FOR SHARING A TRANSPORT CONNECTION ACROSS A MULTI-PROCESSOR PLATFORM WITH LIMITED INTER-PROCESSOR COMMUNICATIONS

FIELD OF THE INVENTION

The present invention generally relates to network connection management. The invention relates more specifically to sharing a transport connection across a multi-processor platform with limited inter-processor communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

1. Description of the Related Art

In computer networks, it is common to collect information about network traffic flow from the network elements involved in the processing of the traffic flow. For example, a network router may export flow information to a collector configured to collect the information and to provide network utilization statistics. In many networks, the communications between the network router and the collector run on transport connections over congestion-controlled transport protocols in order to reduce the impact of network flow information collection on the overall throughput of the network.

The most common congestion-controlled transport protocol used in networks, Transmission Control Protocol (TCP), is connection-oriented endpoint-to-endpoint protocol that does not allow for sharing the transport connection across several logical connection endpoints in a multi-processor platform. However, some network elements comprise one Route Processor and multiple Line Card interfaces. In such network element, each of the Route Processor and the Line Cards are operatively connected to the network and can independently transmit data packets, but only the Route Processor is capable of maintaining the transport connections state information for the network element. The Line Card processors can transmit over the transport connections, but do not have direct access to the data structures that hold the state information of the transport connections.

Consequently, the Line Card processors cannot independently generate packets of network flow information for transmission on these transport connections, especially where the transport connections run over a transport protocol that does not allow for sharing the connection, such as TCP. Furthermore, since the network element provides only for very limited communications between the Route Processor and the Line Card processors, the Line Card processors cannot submit their network flow information to the Route Processor for transmission over the transport connection to the collector.

In some network elements, each Line Card processor is capable of maintaining its own transport connection. A collector connected to such network element for the purpose of collecting network flow information, however, may not be interested in network flow information for each separate card, but instead may only need to know the total network flow information for the network element. In such cases, the collector needs to share, with all the processors in the network element, the same transport connection for transferring network flow information in order to reduce the overhead associated with multiple connections. However, if the transport connection is established over TCP, it is not possible for the Route Processor and all the Line Card processors to share the connection.

Use of other congestion-controlled transport protocols, such as Stream Control Transmission Protocol (SCTP) and Datagram Congestion Control Protocol (DCCP), presents the same problem as the use of TCP described above when these other congestion-controlled transport protocols are used over transport connections between collectors and network elements for the purpose of collecting network flow information.

2. Congestion Control Transport Protocols 2.1 Brief Overview of SCTP

SCTP is a general-purpose transport protocol for message-oriented applications that is designed by the Internet Engineering Task Force (IETF) SIGTRAN working group, which released the SCTP standard draft document *RFC*2960 in October 2000. SCTP provides support for multi-homed hosts, and can be used as the transport protocol for upper-layer applications that require monitoring and detection of loss of session. The computer system hosts communicating over an SCTP transport connection are usually represented by the so-called SCTP endpoints. An SCTP endpoint is the logical sender/receiver of SCTP packets. An SCTP endpoint is associated with a transport address, which is defined by a Network Layer address, a Transport Layer protocol and a Transport Layer port number. For example, in the case of SCTP running over IP, a transport address is defined by the combination of an IP address and an SCTP port number (where SCTP is the Transport Layer protocol). According to the standard SCTP specification, each message sent from one SCTP endpoint to another must be acknowledged by the receiving SCTP endpoint.

An SCTP association is a protocol relationship between SCTP endpoints, and is composed of the two SCTP endpoints and the protocol state information. The protocol state information includes, among other parameters, one or more verification tags, a set of transmission sequence numbers, and a set of stream sequence numbers. An SCTP association can be uniquely identified by the transport addresses used by the endpoints in the association. Two SCTP endpoints cannot have more than one SCTP association between them at any given time.

The data units transported over an SCTP transport connection are referred to as SCTP packets. If SCTP runs over Internet Protocol (IP), an SCTP packet forms the payload of an IP packet. An SCTP packet is composed of a common header and one or more chunks. The common header contains fields for a source port number, a destination port number, a verification tag, and a checksum. The source port numbers and the destination port numbers are used for the identification of an SCTP association. SCTP uses the same port concept used by TCP and the User Datagram Protocol (UDP). The verification tag is a randomly generated value that is SCTP association-specific, and is exchanged between the SCTP endpoints at the SCTP association startup. The verification tag serves as a key that allows a receiver to verify that the SCTP packet belongs to the current SCTP association. The checksum is used for the detection of transmission errors.

A chunk is a unit of information within an SCTP packet, consisting of a chunk header and chunk-specific content. A chunk header includes a chunk type field, used to distinguish upper-layer application data chunks and different types of control chunks, chunk flag field for chunk specific flags, and a chunk length field. The chunk-specific content occupies the rest of the chunk, and is represented as a value field that contains the actual payload of the chunk. A Transmission Sequence Number (TSN) is attached to each chunk containing upper-layer application data to permit the receiving SCTP endpoint to acknowledge the receipt of the chunk and to detect duplicate deliveries. The TSN is a 32-bit sequence number maintained internally by the SCTP stack.

SCTP supports different streams of messages within one SCTP association. A message is a unit of data in a chunk sent by an upper-layer application over the SCTP association from one SCTP endpoint to another. A stream is a uni-directional logical channel established from one SCTP endpoint to another associated SCTP endpoint, within which all data messages are delivered in sequence unless out-of-order delivery is requested by the upper-layer application. A 16-bit sequence number, called the Stream Sequence Number (SSN), is associated with each stream, and is maintained internally by the SCTP stack to ensure sequenced delivery of the data messages within a given stream to the upper-layer application. One SSN is attached to each data message sent or received by the upper-layer application.

2.2 Brief Overview of Partial Reliability SCTP (PR-SCTP)

Partial Reliability SCTP (PR-SCTP) is an extension of SCTP in which the strict message reliability requirement is relaxed. When both sides of an SCTP association support this extension, it can be used by an SCTP implementation to provide partially reliable data transmission service to an upper-layer application or protocol. When messages are transmitted over a PR-SCTP association from one endpoint to another, the sending endpoint may choose to abandon, or skip, messages with TSN numbers that have not been acknowledged by the receiving endpoint based on some criteria such as time outstanding, available memory, or other appropriate criteria. No further attempt to retransmit messages with abandoned TSN numbers will be made by the sending endpoint.

The PR-SCTP extension provides a Forward-TSN-Supported parameter for the INIT and INIT-ACK chunks, and a FORWARD-TSN chunk type. During the establishment of an SCTP association, the Forward-TSN-Supported parameter is used in the INIT and/or INIT-ACK chunks to indicate that the endpoint sending the INIT or INIT-ACK chunk is able to support the FORWARD-TSN chunk. The FORWARD-TSN chunk is used by the sending endpoint to instruct the receiving endpoint to adjust its cumulative received TSN point forward because some missing TSNs are associated with DATA chunks that will not be retransmitted by the sending endpoint. The FORWARD-TSN chunk thus indicates that the receiving endpoint should move its cumulative TSN acknowledgement point forward (possibly skipping past one or more DATA chunks that may not yet have been received and/or acknowledged.) The FORWARD-TSN chunk includes a New Cumulative TSN field, which holds a new cumulative TSN value. The new cumulative TSN value is used by the receiving endpoint to skip/abandon waiting on any missing messages with TSNs smaller than or equal to the new cumulative TSN value. The receiving endpoint thus sets its acknowledgment point to that value as if it had actually received all the data up to the new cumulative TSN number.

2.3 Brief Overview of DCCP

DCCP is a new transport protocol being designed by the IETF primarily to replace UDP as the transport protocol for real-time traffic while providing congestion control capabilities. A draft describing DCCP is *draft-ietf-dccp-spec-09.txt* released by IETF in November 2004.

DCCP provides for unreliable flow of datagrams with acknowledgements. Thus, a DCCP connection includes data traffic as well as acknowledgement traffic. Acknowledgements inform a sender whether its packets arrived, and whether they were marked for end-to-end congestion control. Acknowledgements are transmitted as reliably as the congestion control mechanism in use requires, possibly completely reliably. A DCCP connection runs between DCCP endpoints that are the logical receivers/senders of DCCP traffic.

The unit of data transmitted over a DCCP connection is called a DCCP packet. A DCCP packet includes a packet header and an application data (payload) portion. The DCCP packet header includes, among other fields, a Source Port field, a Destination Port field, a Type field, and a Sequence Number field. The Source Port and the Destination Port fields identify the DCCP connection and are used in the same manner as in TCP and UDP. The Type field specifies the type of the DCCP packet. There are ten DCCP packet types defined in the DCCP specification: DCCP-Request (type value 0), DCCP-Response (type value 0x1), DCCP-Data (type value 0x2), DCCP-Ack (type value 0x3), DCCP-DataAck (type value 0x4), DCCP-CloseReq (type value 0x5), DCCP-Close (type value 0x6), DCCP-Reset (type value 0x7), DCCP-Sync (type value 0x8), and DCCP-SyncAck (type value 0x9).

The Sequence Number field uniquely identifies the DCCP packet in the sequence of all packets a DCCP endpoint sends on the DCCP connection. The Sequence Number increases by one with every packet the endpoint sends, including packets that do not carry application data, such as a DCCP-Ack packet. The Sequence Number field for a source endpoint is initialized by a DCCP-Request or a DCCP-Response packet upon the establishment of the DCCP connection. The DCCP-Sync and DCCP-SyncAck packets are used to synchronize the DCCP endpoints after detected loss of DCCP packets or after endpoint failure. Both the DCCP-Sync and the DCCP-SyncAck packets include an Acknowledgement Number field that holds the next valid Sequence Number for the endpoint that sends the DCCP-Sync or the DCCP-SyncAck. For example, if a source DCCP endpoint detects a burst of packet loss, the source DCCP endpoint sends to the destination DCCP endpoint a DCCP-Sync packet that includes its current Sequence Number in the Acknowledgement Number field. Upon receipt of the DCCP-Sync packet, the destination DCCP endpoint recovers the current Sequence Number of the source DCCP endpoint, and immediately sends to the source DCCP endpoint a DCCP-SyncAck packet that includes in the Acknowledgement Number field the destination DCCP endpoint's current Sequence Number. In this manner, each DCCP endpoints knows the Sequence Number of the next DCCP packet expected from the other endpoint in the DCCP connection.

Based on the foregoing, a technique for sharing a transport connection across a host having two or more processors that exchange limited inter-process communications is desired. In particular, there is a clear need for a technique for sharing a transport connection established over a congestion control transport protocol, such as SCTP or DCCP.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that illustrates a high level overview of another embodiment of a method for sharing a transport connection across a multi-processor host.

DETAILED DESCRIPTION

Figure 1A:
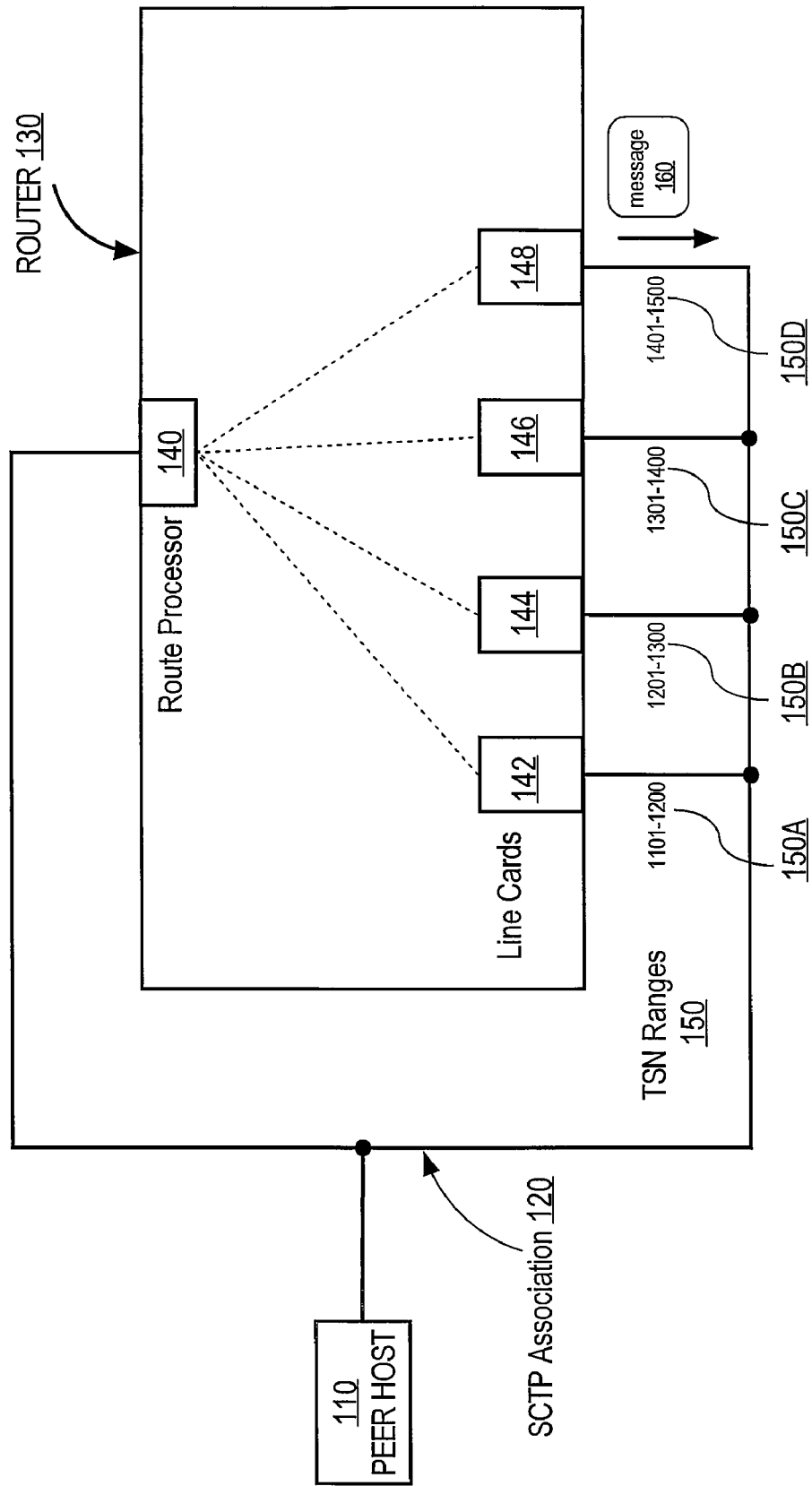
FIG. 1A is a simplified block diagram that illustrates a multi-processor router implementing a method of sharing a transport connection.

A method and apparatus for sharing a transport connection across a host having two or more processors that exchange limited inter-processor communications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Sharing a Transport Connection In a Host Having Multiple Processors that Exchange Limited Inter-Processor Communications
   3.1 Process of Sharing an SCTP Association
   3.2 Process of Sharing a DCCP Connection
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for sharing a transport connection across processors of a host having two or more processors that exchange limited inter-processor communications. The method comprises the steps of assigning a range of transport sequence numbers to each of the processors, sending an outbound message over the transport connection from a processor, and receiving an inbound message over the transport connection. The step of assigning a range of transport sequence numbers comprises assigning a range to a particular processor where the range does not overlap with any other range assigned to any other processor. The step of sending an outbound message from a processor comprises sending a message that includes a transport sequence number from the range of transport sequence numbers assigned to that processor. The step of receiving an inbound message is performed by a designated processor that has been configured to receive all messages sent to the host over the transport connection.

A feature includes the step of generating a set of ranges of transport sequence numbers that have previously been assigned. This feature also includes the step of assigning to each processor a new range of transport sequence numbers, where each new range is not in the set of previously assigned ranges, and each new range does not overlap with any other new range that is assigned to any other processor. In one feature, the steps of assigning a new range of transport sequence numbers to each processor and sending a forward cumulative transport sequence number are performed in response to the expiration of a timer. In addition, the steps of assigning a new range of transport sequence numbers to each processor and sending a forward cumulative transport sequence number may also be performed in response to a request from a processor that has used all of the transport sequence numbers in its assigned range.

In another feature, the step of generating a set of ranges of previously assigned transport sequence numbers is performed by polling each of the processors to determine the ranges of transport sequence numbers that have preciously been assigned to them. In a different feature, the step of generating a set of ranges of previously assigned transport sequence numbers is performed by checking a table in memory that stores the previously assigned numbers.

In another feature, the method further includes the step of sending to a peer host a forward cumulative transport sequence number over the transport connection. The peer host then skips past any messages that include a transport sequence number that is smaller than or equal to the new cumulative transport sequence number.

In a feature, the step of assigning a range of transport sequence numbers is performed by making use of an inter-processor communication mechanism, such as a Remote Procedure Call (RPC), shared memory, or inter-processor signaling.

In a feature, the transport connection is a DCCP connection.

In another aspect, a method for sharing an SCTP transport connection across a host having two or more processors that exchange limited inter-processor communications is described. The method comprises a step of establishing an SCTP association between the multi-processor host and a peer host, a step of assigning a range of transport sequence numbers to each of processors, and a step of sending a message from a processor of the multi-processor host to the peer host. The step of establishing an SCTP association includes designating a processor of the multi-processor host that is configured to receive all messages sent to the multi-processor host from the peer host over the SCTP association. The step of assigning a range of transport sequence number to each processor includes assigning to each processor a range that does not overlap with any other range assigned to any other processor. The step of sending a message from a processor of the multi-processor host comprises sending a message that includes a verification tag of the SCTP association and a transport sequence number from the range assigned to the processor.

In a feature, the method further comprises the steps of sending to the peer host a forward cumulative transport sequence number and skipping, at the peer host, any missing messages that have a transport sequence number smaller than or equal to the new cumulative transport sequence number. In one feature, the steps of assigning a range of transport sequence numbers and sending a forward sequence number to the peer host are performed in response to the peer host failing to acknowledge the receipt of a predetermined number of messages. In addition, the steps of assigning a range of transport sequence numbers and sending a forward sequence number to the peer host may also be performed in response to the peer host acknowledging the receipt of a predetermined number of messages.

In a feature, the method further comprises the step of assigning a different stream of the SCTP association to each of the processors, where each processor can send messages only over the stream assigned to it.

In a feature, the step of establishing an SCTP association between the multi-processor host and the peer host includes establishing the SCTP association according to the standards of a Partial Reliability SCTP (PR-SCTP).

In one feature, the multi-processor host is a router and the peer host is a collector that is configured to collect network management information.

In other aspects, the invention encompasses a computer apparatus and a computer-readable medium configured to carry out the foregoing steps.

2.0 Structural and Functional Overview

Figure 2:
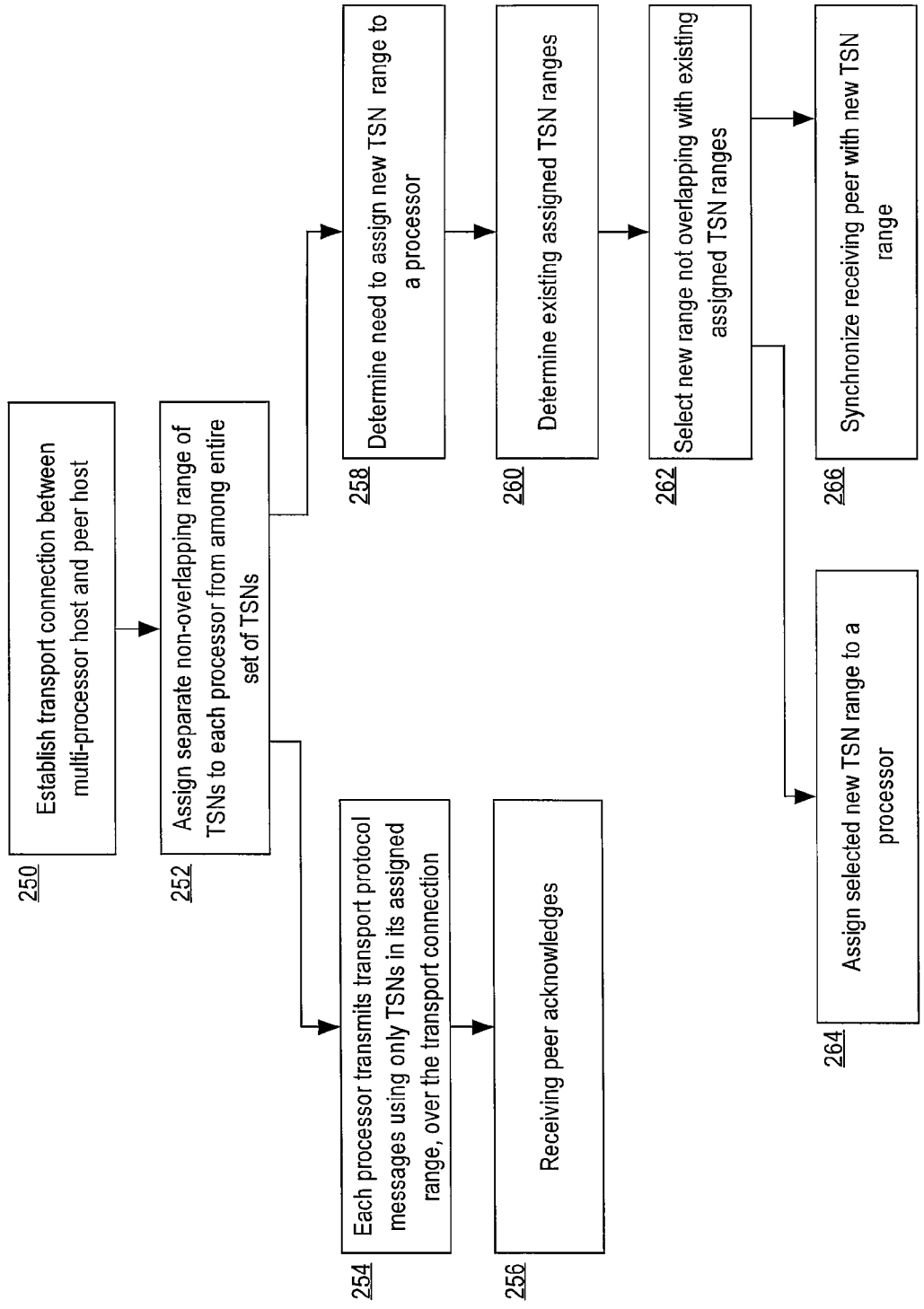
FIG. 2 is a flow diagram of one embodiment of a method of sharing a transport connection across a multi-processor host.

FIG. 2 is a flow diagram of one embodiment of a method for sharing a transport connection across a multi-processor host. The multi-processor host includes two or more processors that are operatively connected to a network and can transmit messages over the network independently of each other. In one aspect, the multi-processor host is a network router that includes one route processor and one or more line cards. The route processor maintains all the transport connections for the router. Each of the line cards includes a processor, and each line card can independently transmit messages or other data over the network. The techniques described herein can be implemented on any computer system that includes more than one processor interfaced to a network and capable of independently transmitting over the network, including a router with one or more line cards. Furthermore, the techniques described herein can be employed to share more than one transport connection across the same multi-processor host.

In step 250, a transport connection is established between the multi-processor host and a peer host. The transport connection conforms to a message-oriented transport protocol.

In step 252, the multi-processor host assigns a separate non-overlapping range of transport sequence numbers to each of its processors. In step 254, each processor transmits messages including a transport sequence number selected only from the range of transport sequence numbers assigned to the processor. In step 256, the peer host receives the messages over the transport connection, and acknowledges the receipt of the messages according to the standard for acknowledgement set by the transport connection protocol.

A range of transport sequence numbers assigned to a processor at step 252 does not overlap with any other range that is currently assigned to the processor, or that has previously been assigned to the processor during the life of the transport connection. The assignment of a range of transport sequence numbers can be accomplished through any inter-processor communication mechanism. After each processor has been assigned a transport sequence number range, each processor can transmit messages over the transport connection. Each message transmitted by a processor includes a transport sequence number selected only from the range of transport sequence numbers assigned to the processor.

A new range of transport sequence numbers can be assigned to each processor if certain conditions have been satisfied. At step 258, a host determines a need to assign a new range of transport sequence numbers to a processor. For example, if a particular processor has used all of its assigned transport sequence numbers, it requests that a new range of transport sequence numbers is assigned to each processor. In another example, a new range of transport sequence numbers is assigned to each processor if a predetermined interval of time has elapsed since the last assignment of transport sequence numbers. In a different example, if the transport connection is established over a protocol requiring the peer host to acknowledge the receipt of each message received, a new range of transport sequence numbers is assigned to each processor if the peer host has failed to acknowledge the receipt of a predetermined number of messages, or if a message acknowledgment received from the peer host indicates that the range of transport sequence numbers assigned to a particular processor is mostly used up. In a yet different example, if a processor exhausts a predetermined threshold number, but not all, of its assigned transport sequence numbers, it requests that new ranges of transport sequence numbers be assigned. In this way the processor can keep working without the risk of running out of transport sequence numbers while the new ranges of numbers are being assigned.

The multi-processor host then determines the set of ranges of transport sequence numbers that have already been assigned as shown by step 260. A new range of transport sequence numbers is selected at step 262. The new range does not overlap with any other new range that is currently being assigned to any other processor, and does not overlap with any other range that has previously being assigned to any processor. The multi-processor host can determine the set of previously assigned transport sequence number ranges by making use of a variety of mechanisms, including but not limited to, polling each processor for its currently assigned range, and checking a table in memory that stores all previously assigned transport sequence numbers.

In some situations, a particular processor may be using up its assigned range of transport sequence numbers much faster than the other processors. In order to prevent the multi-processor host from assigning ranges too often, a range selection policy may be employed at step 262. Various range selection techniques and methods can be used as part of the policy. For example, the host may assign bigger ranges of transport sequence numbers to processors that use their numbers faster, and smaller ranges to processors that use their numbers slower. In another example, the host may select the size of the ranges of transport sequence numbers based on one or more configurable parameters, which parameters can be static/fixed at boot-up or can be set dynamically by an administrator during the operation of the host. The parameters may indicate that the ranges assigned to the different processors are all of the same size, and may indicate what that size is. Alternatively, the parameters may indicate a specific range size for each processor.

The selected new range is assigned to a processor at step 264. At step 266, the receiving peer is synchronized with the new range of transport sequence numbers. For example, the multi-processor host sends the peer host a forward cumulative transport sequence number. The peer host uses the forward cumulative transport sequence number to synchronize the receipt of messages from the multi-processor host by skipping past any missing messages that include a transport sequence number that is smaller than or equal to the new cumulative transport sequence number.

In one embodiment, the peer host is configured as a collector of network management information, and the multi-processor host is a router. The messages sent over the transport connection include information about the network traffic flow passing through the router. In this embodiment, the collector can maintain transport connections to one or more routers, and the router can have transport connections to one or more collectors.

3.0 Method of Sharing a Transport Connection in a Host Having Multiple Processors That Exchange Limited Inter-Processor Communications FIG. 3 is flow diagram that illustrates a high-level overview of one embodiment of a method for sharing an SCTP transport connection across a multi-processor host.

In step 300, an SCTP association is established between the multi-processor host and a peer host. The SCTP Association includes a verification tag, the transport addresses of the multi-processor host and the peer host, and an initial transport sequence number (TSN). One of the processors of the multi-processor host is configured to receive all inbound messages sent over the SCTP association. In a different embodiment, the transport connection is a PR-SCTP association. In another embodiment, the transport connection is a DCCP connection. In different embodiments, the transport connection can be established over any message-oriented transport protocol that provides for sequenced and/or ordered transmission of messages or of other data units.

In step 305, a range of transport sequence numbers is assigned to each of the processors of the multi-processor host, where any particular range assigned to a processor does not overlap with any other range that is currently assigned to a processor or has previously been assigned to a processor during the life of the SCTP association.

In step 310, a FORWARD-TSN chunk is sent to the peer host in order to instruct the peer host to skip any missing messages with TSNs that are smaller than or equal to the new cumulative TSN that is included in the chunk. In step 315, a processor of the multi-processor host sends to the peer host a message. The message includes at least the verification tag of the SCTP association, and a transport sequence number selected from the range of transport sequence numbers assigned to that processor.

3.1 Process of Sharing an SCTP Association

The method for sharing an SCTP transport connection across a multi-processor host generally shown in FIG. 3 can be understood with reference to FIG. 1A, which depicts a multi-processor router 130, a peer host 110, and an SCTP association 120 that is established between router 130 and peer host 110. Router 130 includes route processor 140, and line cards 142, 144, 146, and 148, each of which includes a processor. Route processor 140 and line cards 142, 144, 146, and 148 can engage in limited inter-processor communications via any known inter-processor communication mechanism including, but not limited to, shared memory, Remote Procedure Call (RPC), and inter-processor signaling. Router 130 is depicted in FIG. 1A as having four line cards as an illustration only, and can include any number of line cards.

In the embodiment of FIG. 1A, route processor 140 is a processor designated and configured to receive all messages sent from peer host 110 over SCTP association 120. Line cards 142, 144, 146, and 148 are configured to send messages over SCTP association 120 to peer host 110 by generating and transmitting valid SCTP packets that are properly identified as belonging to the association.

Peer host 110 is a computer system that includes at least a memory, one or more processors, an interface that operatively connects peer host 110 to a network, and one or more sequences of computer instructions that can be executed by the processor or processors. In one embodiment, peer host 110 is a collector configured to collect network flow information from various network elements, such as bridges, switches, and routers, of a network that includes router 130.

SCTP association 120 is a transport connection established between peer host 110 and router 130 according to an SCTP standard. In one embodiment, SCTP association 120 is established over a Partial Reliability SCTP (PR-SCTP) standard. SCTP association 120 includes at least one verification tag, a current transport sequence number (TSN), and the transport addresses of peer host 110 and router 130. The transport addresses of peer host 110 include the addresses of route processor 140 and the addresses of line cards 142, 144, 146, and 148. For example, if SCTP association 120 is established over an Internet Protocol (IP) network, the transport addresses for route processor 140 and line cards 142, 144, 146, and 148 include the IP addresses of the route processor and the line cards along with the port number assigned by router 130 to the SCTP association.

In operation, route processor 140 assigns to line cards 142, 144, 146, and 148 an initial set of transport sequence number (TSN) Ranges 150. As an example, line card 142 is assigned TSN Range 150A which includes transport sequence numbers from "1101" to "1200"; line card 144 is assigned TSN Range 150B which includes transport sequence numbers from "1201" to "1300"; line card 146 is assigned TSN Range 150C which includes transport sequence numbers from "1301" to "1400"; and line card 148 is assigned TSN Range 150D which includes transport sequence numbers from "1401" to "1500". TSN Ranges 150A, 150B, 150C, and 150D do not overlap, i.e. the transport sequence numbers in each range do not repeat in any other range. The specific values for TSNs given here and in FIG. 1B are mere examples, and any values may be used.

Each of line cards 142, 144, 146, and 148 is allowed to transmit a message over the same SCTP association 120 by generating a valid SCTP packet for the association. For example, as depicted in FIG. 1A, line card 148 sends a message 160 over SCTP Association 120 to peer host 110. Message 160 is represented by a valid SCTP packet that includes a data chunk with information. In order for message 160 to be identified by peer host 160 as a valid message, the SCTP packet must conform to the proper format of an SCTP packet. The SCTP packet header includes at least the verification tag of SCTP association 120, and the data chunk with information includes a TSN selected from the TSN Range 150D that is assigned to line card 148. In order words, the TSN is selected from the range of "1401" to "1500".

Each of the other line cards can transmit a message over SCTP Association 120 in a similar fashion, except that a message generated by a line card includes a TSN selected only from the range of transport sequence numbers that is assigned to that line card. If needed, route processor 140 can also transmit a message over SCTP association 120 but must include in the message a TSN that is not assigned to any of line cards 142, 144, 146, and 146, such as, for example, a TSN selected from the range of "1501" to "1600".

Figure 1B:
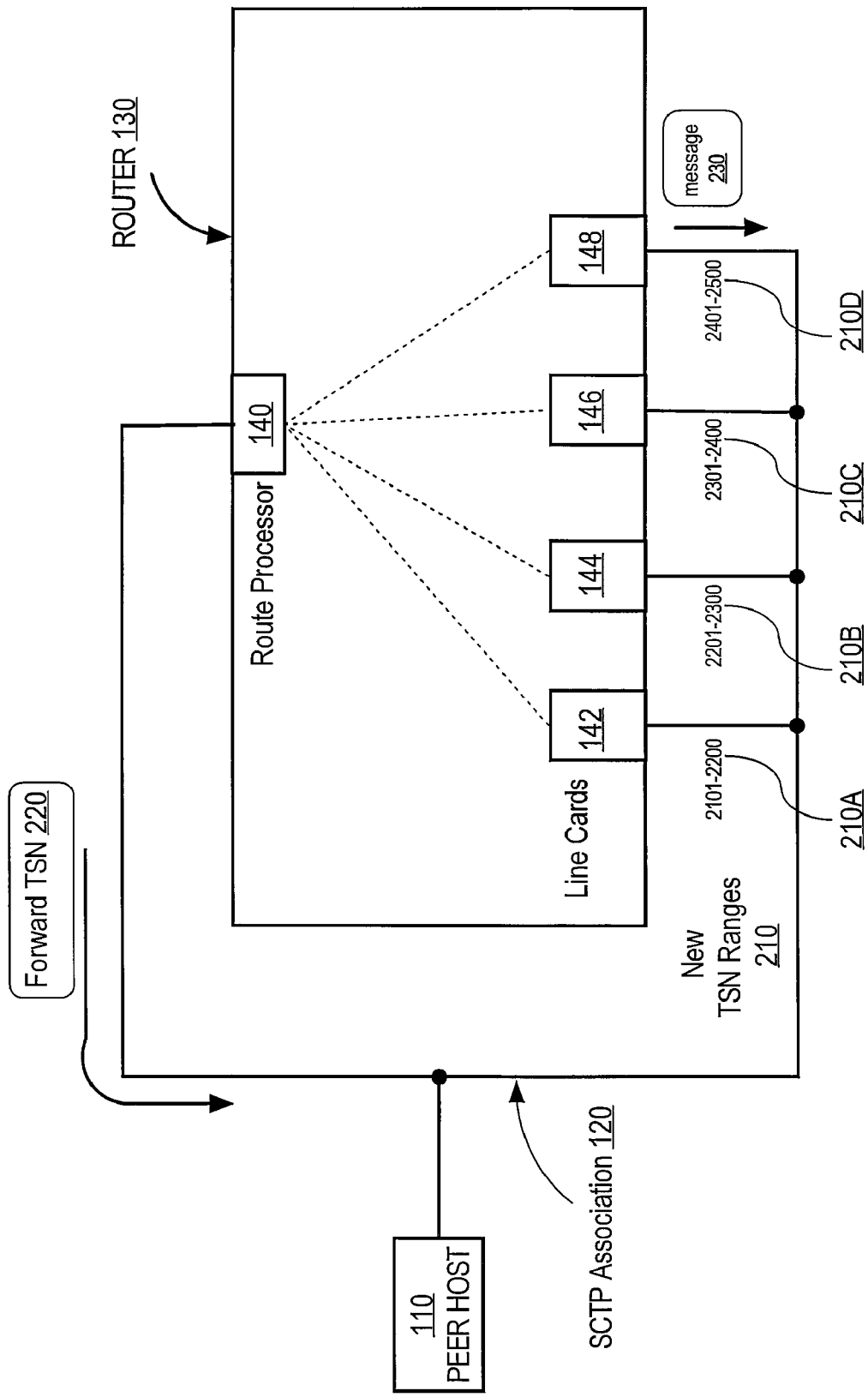
FIG. 1B is a simplified block diagram that illustrates another multi-processor router implementing a method of sharing a transport connection.

FIG. 1B illustrates router 130 implementing a method for sharing SCTP association 120 according to another embodiment. Route processor 140 generates a set of ranges of transport sequence numbers that have previously being assigned. For example, if any one of line cards 142, 144, 146, and 148 has used all of its assigned TSNs, the set of previously assigned transport sequence numbers will include TSN Ranges 150 (i.e. TSN Ranges 150A, 150B, 150C, and 150D that are depicted in FIG. 1). Route processor then assigns New TSN Ranges 210 to each of line cards 142, 144, 146, and 148. Line card 142 is assigned new TSN Range 210A which includes transport sequence numbers from "2101" to "2200"; line card 144 is assigned new TSN Range 210B which includes transport sequence numbers from "2201" to "2300"; line card 146 is assigned new TSN Range 210C which includes transport sequence numbers from "2301" to "2400";

and line card 148 is assigned new TSN Range 210D which includes transport sequence numbers from "2401" to "2500". TSN Ranges 210A, 210B, 210C, and 210D do not overlap, and the transport sequence numbers in each range do not overlap with any of the ranges in TSN Ranges 150 (which is depicted in FIG. 1A)

Route processor 140 then sends a Forward TSN message 220 over the SCTP association 120 to peer host 110. Forward TSN message 220 includes a verification tag of SCTP Association 120, and a FORWARD-TSN chunk that includes a new forward cumulative TSN number for SCTP association 120. In the example depicted in FIG. 2, the new cumulative TSN is "2100".

Upon receipt of Forward TSN message 220, peer host 110 reads the new cumulative TSN from the FORWARD-TSN chunk, and sets its cumulative TSN acknowledgment point to 2100. Peer host 110 then skips past any messages, received over SCTP association 120, which include a TSN that is smaller than or equal to the new cumulative transport sequence number, in this case "2100". Thus, the next expected transport sequence number for peer host 110 is "2101". In this way, peer host 110 ensures that it will process only messages that are currently sent from line cards 142, 144, 146, and 148, and any old or stale messages will be discarded.

Each of line cards 142, 144, 146, and 148 can transmit messages to peer host 110 over SCTP association 120 in the manner described above. For example, line card 148 can transmit message 230 to peer host 110. Message 230 includes at least the verification tag of SCTP association 120, and a transport sequence number selected from the range of transport sequence numbers currently assigned to line card 148, i.e. a transport sequence number from New TSN Range 210D which includes transport sequence numbers from "2401" to "2500".

Router 130, as depicted in FIGS. 1A, 1B, is only an example of a computer system on which embodiments can be implemented. Embodiments can be implemented on any computer system, apparatus, or device, that includes at least a memory, two or more processors operatively coupled to the memory, where each processor is operatively connected to a network and can transmit messages over the network, and one or more sequences of instructions stored in a computer-readable medium that is accessible by the processors.

In one embodiment, the SCTP association of FIGS. 1A, 1B is established between a router and a collector. In this embodiment, the SCTP association is maintained by the route processor on the router. Each line card is assigned a particular stream of the SCTP association, and can transmit messages to the collector only over its assigned stream. Each line card maintains its own Stream Sequence Numbers (SSNs). When a line card processor generates an SCTP packet for sending over the SCTP association to the collector, the line card processor includes in the packet header the verification tag of the SCTP association, and a TSN selected from the range of transport sequence numbers currently assigned to it. The line card processor then assembles a data chunk with the information it wants to send to the collector, and includes in the chunk header the next SSN for its stream. The collector receives the SCTP packet with the data chunk, and, based on the stream on which the message is received, determines which line card of the router send the SCTP packet.

3.2 Process of Sharing a DCCP Connection

The techniques are described herein for sharing a DCCP connection across a multi-processor host with limited inter-communications. A DCCP connection is established in the usual manner between a designated processor of the multi-processor host and a peer host. The designated processor is configured to receive all inbound messages from the peer host over the DCCP connection. A range of DCCP packet Sequence Numbers (SNs) is assigned to each of the processors of the multi-processor host, where each range assigned to a particular processor does not overlap with any other range assigned to any other processor.

A processor of the multi-processor host generates a DCCP packet for sending to the peer host. The packet includes an SN from the range of sequence numbers assigned to the processor. The processor then transmits the DCCP packet to the peer host.

If certain conditions are met (such as the expiration of a timer or a processor of the multi-processor host using all of its assigned SNs), the designated processor assign a new range of sequence numbers to each processor, where each newly assigned range does not overlap with any other range currently being assigned to any other processor, and does not overlap with any other range previously assigned to any processor. The designated processor then sends a DCCP-Synch packet to the peer host, where the Acknowledgement Number field of the DCCP-Synch packet includes the smallest of the newly assigned SNs as a forward-SN.

The peer host receives the DCCP-Synch packet. The peer host then retrieves the forward-SN from the DCCP-Synch packet, and uses it to update the data structures that support the DCCP connection. In this manner, the peer host synchronizes the SN that it keeps for the multi-processor host with the SN of the next packet to be received from the designated processor on the multi-processor host. Any subsequent DCCP packets received from any of the processors of the multi-processor host has a SN that is higher than the forward-SN by virtue of the assignment of SN ranges to each processor.

4.0 Implementation Mechanisms—Hardware Overview

Figure 4:
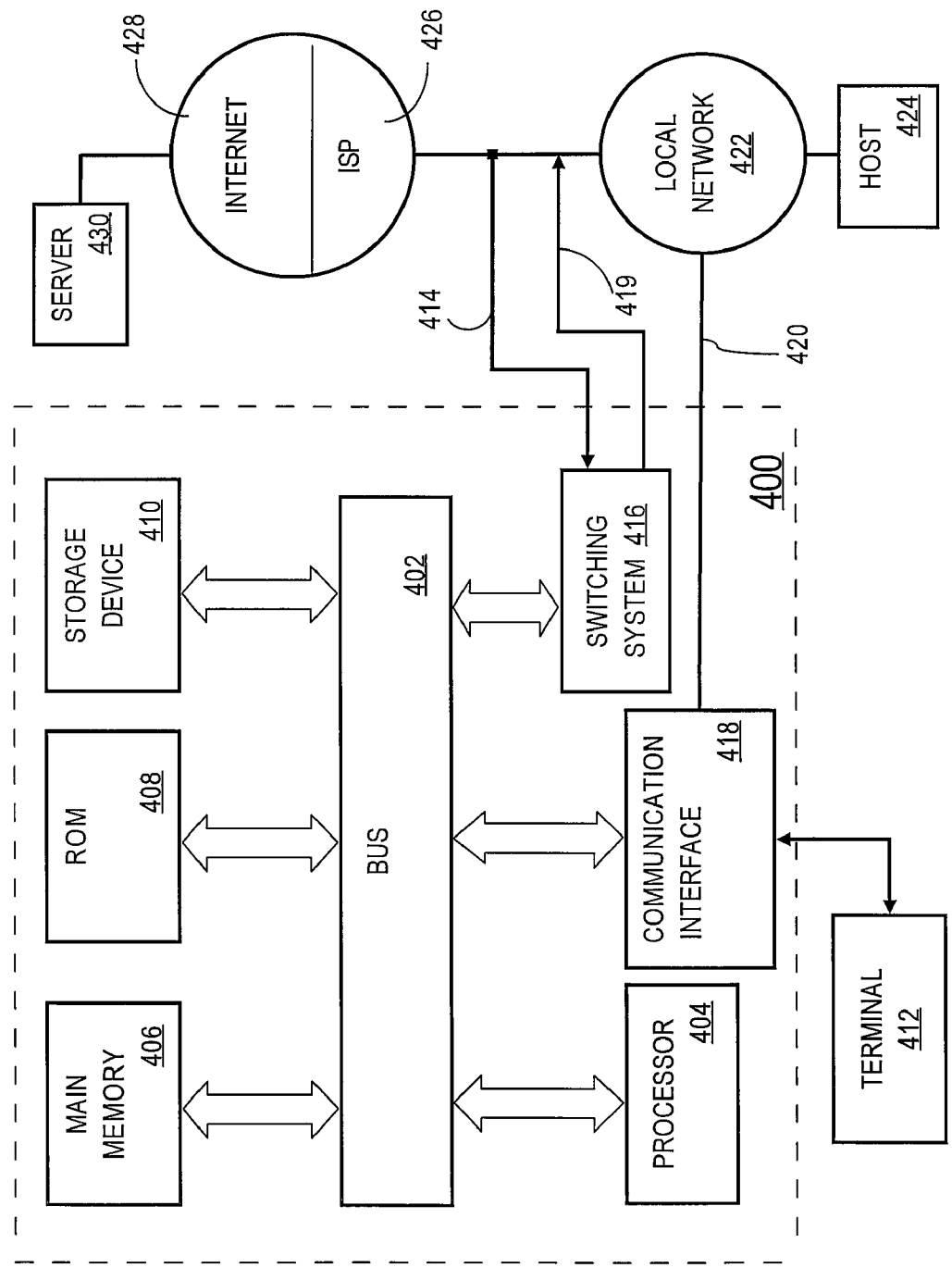
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The input interface 414 and the output interface 419 include one or more line card processors. The external network elements may include a local network 422 coupled to one or more hosts 424, or a global network such as Internet 428 having one or more servers 430. The switching system 416 switches information traffic arriving on input interface 414 to output interface 419 according to predetermined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other route and switching devices in local network 422 or Internet 428.

The invention is related to the use of computer system 400 for sharing a transport connection across processor 404 and the line card processors of input interface 414 and output interface 419. According to one embodiment of the invention, sharing of a transport connection is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for sharing a transport connection across a multi-processor platform as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sharing a transport connection in a host having two or more processors, the method comprising the computer-implemented steps of:

assigning ranges of transport sequence numbers to the two or more processors, wherein a particular range assigned to a particular processor does not overlap with any other range that is assigned to any other processor;

wherein the two or more processors in the host exchange limited inter-processor communications;

wherein only a designated processor, of the two or more processors, is operable to maintain state information for the transport connection;

sending, over the transport connection, an outbound message from a processor of the two or more processors, wherein the outbound message includes a transport sequence number selected only from the range of the transport sequence numbers assigned to the processor; and receiving, over the transport connection, an inbound message at the designated processor of the two or more processors, wherein the designated processor is configured to receive all inbound messages sent to the host over the transport connection;

wherein the inbound message includes an acknowledgement of the outbound message.

2. A method as recited in claim 1, further comprising:

generating a set of assigned ranges of the transport sequence numbers; and assigning a new range of the transport sequence numbers, which is not in the set of assigned ranges, to each of the two or more processors, wherein a particular new range assigned to the particular processor does not overlap with any other range that is assigned to any other processor.

3. A method as recited in claim 2, wherein the steps of generating the set of assigned ranges and assigning the new range of the transport sequence numbers are performed in response to the expiration of a timer.

4. A method as recited in claim 2, wherein the steps of generating the set of assigned ranges and assigning the new range of the transport sequence numbers are performed in response to a request from the particular processor that has used all the transport sequence numbers from the particular range assigned to that particular processor.

5. A method as recited in claim 2, wherein the step of generating the set of assigned ranges comprises polling each processor of the two or more processors to determine the ranges of the transport sequence numbers that have been assigned to said each processor.

6. A method as recited in claim 2, wherein the step of generating the set of assigned ranges comprises checking a table in memory to determine the ranges of the transport sequence numbers that have been assigned.

7. A method as recited in claim 1, further comprising the step of sending to a peer host a forward cumulative transport sequence number, wherein the peer host skips any one or more missing messages including any one or more transport sequence numbers that are smaller than or equal to the forward cumulative transport sequence number.

8. A method as recited in claim 1, wherein the step of assigning the ranges of the transport sequence numbers is performed by making use of an inter-processor communication mechanism.

9. A method as recited in claim 1, wherein the transport connection is a Datagram Congestion Control Protocol (DCCP) connection.

10. A method for sharing a Stream Control Transmission Protocol (SCTP) association across a host having two or more processors, the method comprising the computer-implemented steps of:

establishing an SCTP association between the host and a peer host, wherein a designated processor of the two or more processors is configured to receive all inbound messages sent over the SCTP association by the peer host;

wherein the inbound messages include acknowledgements of all corresponding outbound messages that are sent to the peer host over the SCTP association by the two or more processors;

wherein the two or more processors in the host exchange limited inter-processor communications;

wherein only the designated processor is operable to maintain state information for the SCTP association;

assigning a range of transport sequence numbers to each of the two or more processors, wherein a particular range assigned to a particular processor does not overlap with any other range that has been assigned to any other processor; and sending an outbound message from a processor of the two or more processors to the peer host over the SCTP association, wherein the outbound message includes a verification tag of the SCTP association and a transport sequence number selected from the range of the transport sequence numbers assigned to the processor.

11. A method as recited in claim 10, further comprising:

generating a set of assigned ranges of the transport sequence numbers;

assigning a new range of the transport sequence numbers, which is not in the set of assigned ranges, to each of the two or more processors, wherein a particular new range assigned to the particular processor does not overlap with any other range that is assigned to any other processor; and sending a forward cumulative transport sequence number to the peer host over the SCTP association;

wherein sending the forward cumulative transport sequence number to the peer host comprises causing the peer host to skip past any one or more missing messages that include any one or more transport sequence numbers that are smaller than or equal to the forward cumulative transport sequence number.

12. A method as recited in claim 11, wherein the steps of generating the set of assigned ranges, assigning the new range of the transport sequence numbers, and sending the forward cumulative transport sequence number are performed in response to the expiration of a timer.

13. A method as recited in claim 11, wherein the steps of generating the set of assigned ranges, assigning the new range of the transport sequence numbers, and sending the forward cumulative transport sequence number are performed in response to a request from a particular processor that has used all the transport sequence numbers from the particular range assigned to that particular processor.

14. A method as recited in claim 11, wherein the steps of generating the set of assigned ranges, assigning the new range of the transport sequence numbers, and sending the forward cumulative transport sequence number are performed in response to failing to receive, from the peer host, acknowledgements of a preset number of messages.

15. A method as recited in claim 11, wherein the steps of generating the set of assigned ranges, assigning the new range of the transport sequence numbers, and sending the forward cumulative transport sequence number are performed in response to receiving, from the peer host, acknowledgements of a preset number of messages.

16. A method as recited in claim 11, wherein the step of generating the set of assigned ranges comprises polling each processor of the two or more processors to determine the ranges of the transport sequence numbers that have been assigned to said each processor.

17. A method as recited in claim 11, wherein the step of generating the set of assigned ranges comprises checking a table in memory to determine the ranges of the transport sequence numbers that have been assigned to the two or more processors.

18. A method as recited in claim 10, further comprising assigning a different stream of the SCTP association to each of the two or more processors, wherein each processor of the two or more processors sends messages only over the stream assigned to said each processor.

19. A method as recited in claim 10, wherein:
the host comprises a router; and
the peer host comprises a collector that is configured to collect network management information.

20. A method as recited in claim 10, wherein the SCTP association is established according to a Partial Reliability Stream Control Transmission Protocol (PR-SCTP) standard.

21. An apparatus comprising:
a memory;
two or more processors operatively coupled to the memory, wherein:
the two or more processors are operable to exchange limited inter-processor communications;
the two or more processors are operable to share a transport connection;
each of the two or more processors is operatively connectable to a network; and
only a designated processor, of the two or more processors, is operable to maintain state information for the transport connection;
one or more stored sequences of instructions which, when executed, cause:
assigning ranges of transport sequence numbers to the two or more processors, wherein a particular range assigned to a particular processor does not overlap with any other range that is assigned to any other processor;
sending, over the transport connection, an outbound message from a processor of the two or more processors, wherein the outbound message includes a transport sequence number selected only from the range of the transport sequence numbers assigned to the processor; and
receiving, over the transport connection, an inbound message at the designated processor of the two or more processors, wherein the designated processor is configured to receive all inbound messages that are sent over the transport connection;
wherein the inbound message includes an acknowledgement of the outbound message.

22. An apparatus as recited in claim 21, wherein the apparatus comprises a router.

23. The apparatus of claim 21, wherein the one or more stored sequences of instructions further comprise instructions which, when executed, cause:
generating a set of assigned ranges of the transport sequence numbers; and
assigning a new range of the transport sequence numbers, which is not in the set of assigned ranges, to each of the two or more processors, wherein a particular new range assigned to the particular processor does not overlap with any other range that is assigned to any other processor.

24. The apparatus of claim 23, wherein the instructions that cause generating the set of assigned ranges and assigning the new range of the transport sequence numbers are performed in response to one or more of:
the expiration of a timer; and
a request from a particular processor that has used all the transport sequence numbers from the particular range assigned to that particular processor.

25. The apparatus of claim 23, wherein the instructions that cause generating the set of assigned ranges comprise instructions which, when executed, cause one or more of:
polling each processor of the two or more processors to determine the ranges of the transport sequence numbers that have been assigned to said each processor; and
checking a table in the memory to determine the ranges of the transport sequence numbers that have already been assigned.

26. The apparatus of claim 21, wherein the one or more stored sequences of instructions further comprise instructions which, when executed, cause sending to a peer host a forward cumulative transport sequence number, wherein the peer host skips any one or more missing messages including any one or more transport sequence numbers that are smaller than or equal to the forward cumulative transport sequence number.

27. A computer-readable storage medium storing one or more sequences of instructions for sharing a transport connection across a host having two or more processors, which instructions, when executed by one or more processors, cause the one or more processors to carry out the steps of:
assigning ranges of transport sequence numbers to the two or more processors, wherein a particular range assigned to a particular processor does not overlap with any other range that is assigned to any other processor;
wherein the two or more processors in the host exchange limited inter-processor communications;
wherein only a designated processor, of the two or more processors, is operable to maintain state information for the transport connection;
sending, over the transport connection, an outbound message from a processor of the two or more processors, wherein the outbound message includes a transport sequence number selected only from the range of the transport sequence numbers assigned to the processor; and
receiving, over the transport connection, an inbound message at the designated processor of the two or more processors, wherein the designated processor is configured to receive all inbound messages sent to the host over the transport connection;
wherein the inbound message includes an acknowledgement of the outbound message.

28. A computer-readable storage medium as recited in claim 27, further comprising instructions which, when executed by the one or more processors, cause the one or more processors to carry out the steps of:
generating a set of assigned ranges of the transport sequence numbers; and
assigning a new range of the transport sequence numbers, which is not in the set of assigned ranges, to each of the two or more processors, wherein a particular new range assigned to the particular processor does not overlap with any other range that is assigned to any other processor.

29. A computer-readable storage medium as recited in claim 27, further comprising instructions which, when executed by the one or more processors, cause the one or more processors to carry out the step of sending to a peer host a forward cumulative transport sequence number, wherein the peer host skips any one or more missing messages including any one or more transport sequence numbers that are smaller than or equal to the forward cumulative transport sequence number.

30. A computer-readable storage medium as recited in claim 27, wherein the transport connection is a Datagram Congestion Control Protocol (DCCP) connection.

31. A computer-readable storage medium storing one or more sequences of instructions for sharing a Stream Control Transmission Protocol (SCTP) association across a host having two or more processors, which instructions, when executed by one or more processors, cause the one or more processors to carry out the steps of:
   establishing the SCTP association between the host and a peer host, wherein a designated processor of the two or more processors is configured to receive all inbound messages sent over the SCTP association by the peer host;
   wherein the inbound messages include acknowledgements of all corresponding outbound messages that are sent to the peer host over the SCTP association by the two or more processors;
   wherein the two or more processors in the host exchange limited inter-processor communications;
   wherein only the designated processor is operable to maintain state information for the SCTP association;
   assigning a range of transport sequence numbers to each of the two or more processors, wherein a particular range assigned to a particular processor does not overlap with any other range that has been assigned to any other processor; and
   sending an outbound message from a processor of the two or more processors to the peer host over the SCTP association, wherein the outbound message includes a verification tag of the SCTP association and a transport sequence number selected from the range of the transport sequence numbers assigned to the processor.

32. A computer-readable storage medium as recited in claim 31, further comprising instructions which, when executed by the one or more processors, cause the one or more processors to carry out the steps of:
   generating a set of assigned ranges of the transport sequence numbers;
   assigning a new range of the transport sequence numbers, which is not in the set of assigned ranges, to each of the two or more processors, wherein a particular new range assigned to the particular processor does not overlap with any other range that is assigned to any other processor; and
   sending a forward cumulative transport sequence number to the peer host over the SCTP association;
   wherein sending the forward cumulative transport sequence number to the peer host comprises causing the peer host to skip past any one or more missing messages that include any one or more transport sequence numbers that are smaller than or equal to the forward cumulative transport sequence number.

33. A computer-readable storage medium as recited in claim 32, wherein the instructions for carrying out the steps of generating the set of assigned ranges, assigning the new range of the transport sequence numbers, and sending the forward cumulative transport sequence number further comprise instructions for carrying out the steps in response to a request from a particular processor that has used all the transport sequence numbers from the particular range assigned to that particular processor.

34. A computer-readable storage medium as recited in claim 32, wherein the instructions for carrying out the steps of generating the set of assigned ranges, assigning the new range of the transport sequence numbers, and sending the forward cumulative transport sequence number further comprise instructions for carrying out the steps in response to receiving, from the peer host, acknowledgements of a preset number of messages.

35. A computer-readable storage medium as recited in claim 31, further comprising instructions which, when executed by the one or more processors, cause the one or more processors to carry out the step of assigning a different stream of the SCTP association to each of the two or more processors, wherein each processor of the two or more processors sends messages only over the stream assigned to said each processor.

36. A computer-readable storage medium as recited in claim 31, wherein the SCTP association is established according to a Partial Reliability Stream Control Transmission Protocol (PR-SCTP) standard.

37. An apparatus comprising:
   a memory;
   two or more processors operatively coupled to the memory, wherein:
      the two or more processors are operable to share a Stream Control Transmission Protocol (SCTP) association;
      the two or more processors are operable to exchange limited inter-processor communications;
      each of the two or more processors is operatively connectable to a network; and
      only a designated processor, of the two or more processors, is operable to maintain state information for the SCTP association;
   one or more stored sequences of instructions which, when executed, cause:
      establishing the SCTP association to a peer host, wherein the designated processor of the two or more processors is configured to receive all inbound messages sent over the SCTP association by the peer host;
      wherein the inbound messages include acknowledgements of all corresponding outbound messages that are sent to the peer host over the SCTP association by the two or more processors;
      assigning a range of transport sequence numbers to each of the two or more processors, wherein a particular range assigned to a particular processor does not overlap with any other range that has been assigned to any other processor; and
      sending an outbound message from a processor of the two or more processors to the peer host over the SCTP association, wherein the outbound message includes a verification tag of the SCTP association and a transport sequence number selected from the range of the transport sequence numbers assigned to the processor.

38. The apparatus of claim 37, wherein the one or more stored sequences of instructions further comprise instructions which, when executed, cause:
   generating a set of assigned ranges of the transport sequence numbers;
   assigning a new range of the transport sequence numbers, which is not in the set of assigned ranges, to each of the two or more processors, wherein a particular new range assigned to the particular processor does not overlap with any other range that is assigned to any other processor; and sending a forward cumulative transport sequence number to the peer host over the SCTP association;

wherein sending the forward cumulative transport sequence number to the peer host comprises causing the peer host to skip past any one or more missing messages that include any one or more transport sequence numbers that are smaller than or equal to the forward cumulative transport sequence number.

39. The apparatus of claim 38, wherein the instructions that cause generating the set of assigned ranges, assigning the new range of the transport sequence numbers, and sending the forward cumulative transport sequence number are performed in response to one or more of:

the expiration of a timer; and a request from a particular processor that has used all the transport sequence numbers from the particular range assigned to that particular processor.

40. The apparatus of claim 38, wherein the instructions that cause generating the set of assigned ranges, assigning the new range of the transport sequence numbers, and sending the forward cumulative transport sequence number are performed in response to failing to receive, from the peer host, acknowledgements of a preset number of messages.

41. The apparatus of claim 38, wherein the instructions that cause generating the set of assigned ranges, assigning the new range of the transport sequence numbers, and sending the forward cumulative transport sequence number are performed in response to receiving, from the peer host, acknowledgements of a preset number of messages.

42. The apparatus of claim 38, wherein the instructions that cause generating the set of assigned ranges comprise instructions which, when executed, cause one or more of:

polling each processor of the two or more processors to determine the ranges of the transport sequence numbers that have been assigned to said each processor; and checking a table in the memory to determine the ranges of the transport sequence numbers that have been assigned to the two or more processors.

43. The apparatus of claim 37, wherein the one or more stored sequences of instructions further comprise instructions which, when executed, cause assigning a different stream of the SCTP association to each of the two or more processors, wherein each processor of the two or more processors sends messages only over the stream assigned to said each processor.

* * * * *